Figure 1:
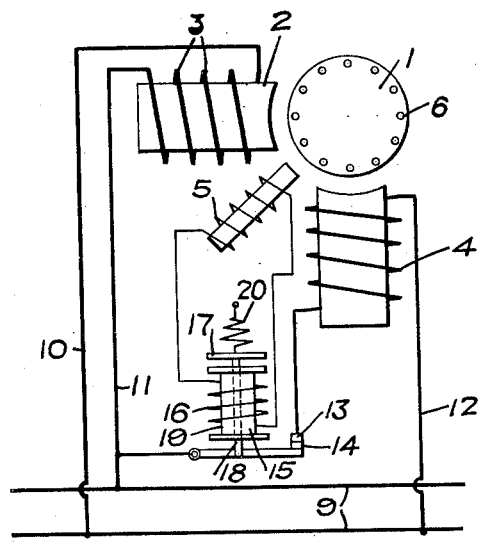

O. S. JENNINGS.
STARTING DEVICE FOR ELECTRIC MOTORS.
APPLICATION FILED JUNE 5, 1916.

1,315,965.

Patented Sept. 16, 1919.

WITNESSES:

INVENTOR
Oliver S. Jennings.
BY
ATTORNEY

UNITED STATES PATENT OFFICE.

OLIVER S. JENNINGS, OF WILKINSBURG, PENNSYLVANIA, ASSIGNOR TO WESTINGHOUSE ELECTRIC AND MANUFACTURING COMPANY, A CORPORATION OF PENNSYLVANIA.

STARTING DEVICE FOR ELECTRIC MOTORS.

1,315,965.   Specification of Letters Patent.   Patented Sept. 16, 1919.

Application filed June 5, 1916. Serial No. 101,726.

*To all whom it may concern:*

Be it known that I, OLIVER S. JENNINGS, a citizen of the United States, and a resident of Wilkinsburg, in the county of Allegheny and State of Pennsylvania, have invented a new and useful Improvement in Starting Devices for Electric Motors, of which the following is a specification.

My invention relates to electric motors, and particularly to single-phase induction and similar motors in which auxiliary starting windings are employed to assist in producing sufficient torque during the starting period.

The object of my invention is to provide simple and effective means for interrupting the circuit of the starting winding of an induction motor, or for otherwise rendering the starting means ineffective when the motor attains a predetermined speed.

Single-phase induction motors are usually provided with auxiliary starting windings of relatively high resistance so that it is desirable to interrupt the circuits of such windings when the motors obtain predetermined speeds. The means heretofore employed for this purpose have usually been operated by centrifugal force and consequently have been complicated and expensive in construction and more or less unreliable in operation. Centrifugally-actuated devices of this character are particularly unreliable when used in connection with motors operating at relatively low speeds, such, for example, as motors driving ceiling fans.

In Patent No. 934,466, granted to H. M. Scheibe on Sept. 21, 1909, and assigned to the Westinghouse Electric & Manufacturing Company, there is shown and described a device for interrupting the circuit of the starting winding of an induction motor, the operation of which is dependent upon the cross-magnetizing flux produced in the primary core member of the motor by the reaction of the secondary member. This device comprises in general a magnetizable armature or keeper embedded in the primary core member and adapted to control the circuit of the starting winding. This device has been found to be quite satisfactory in operation but it necessitates a special construction of the primary core member and furthermore cannot be readily embodied in motors already in service.

According to the present invention, I provide a single-phase motor with an auxiliary winding, in addition to the starting winding, which is adapted to operate a suitable relay device and thereby control the circuit of the starting winding. The auxiliary winding is so arranged with respect to the primary and starting windings of the motor that the voltage induced therein by the resultant flux in the primary core member shall be substantially a minimum when the motor is at rest and shall be substantially a maximum when the motor reaches the speed at which it is most desirable to interrupt the circuit of the starting winding. Consequently, the voltage induced in the auxiliary winding is a function of the slip of the motor and is dependent upon the cross-flux produced in the primary core member by the reaction of the secondary member.

Figure 2:
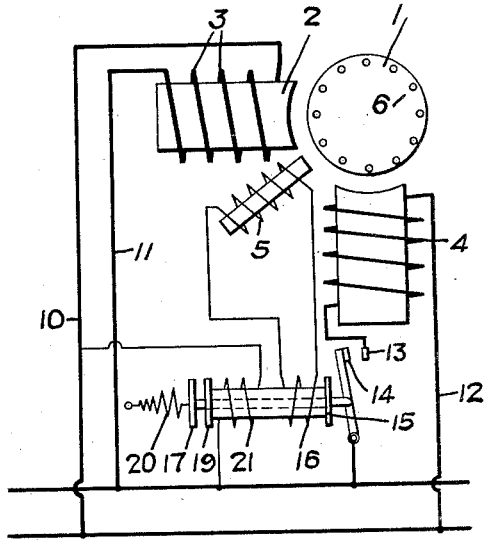
Figure 3:
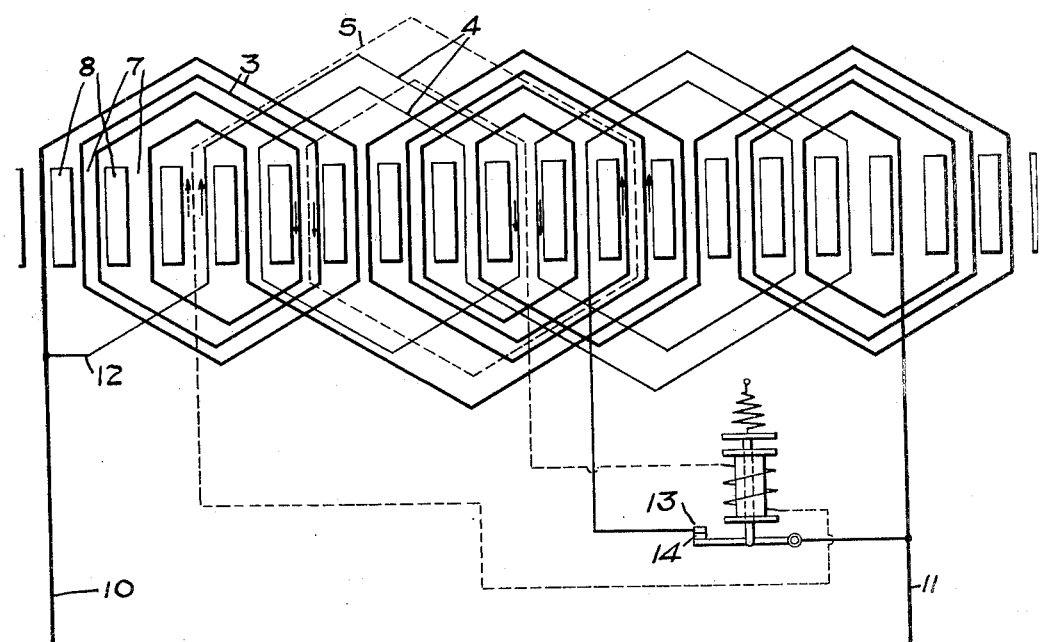

In the accompanying drawings, Figure 1 is a diagrammatic view of a single-phase motor embodying my invention and showing the connections of the relay device for controlling the circuit of the starting winding; Fig. 2 is a view, similar to Fig. 1, showing a modification of the relay device; and Fig. 3 is a developed view of the motor winding shown diagrammatically in Fig. 1.

The motor comprises relatively rotatable magnetizable members 1 and 2 which are provided with a primary winding 3, a starting winding 4 and an auxiliary winding 5 and a secondary winding 6, respectively. As shown best in Fig. 3, the primary core member 1 is provided with a plurality of slots 7 and teeth 8. The main winding 3 and the starting winding 4 are so distributed in the slots 7 that there are six teeth per pole for each winding. The windings 3 and 4 are so arranged with respect to each other that the magnetic axes of the poles produced by the starting winding 4 are displaced substantially ninety electrical degrees from the magnetic axes of the poles produced by the primary winding 3. The auxiliary winding 5 is arranged to produce poles intermediate poles of unlike polarity of the windings 3 and 4.

Referring to Fig. 1, the main winding 3 is adapted to be connected to a suitable single-phase source 9 through conductors 10 and 11 and one terminal of the starting winding 4 is connected to one main of the source 9 through a conductor 12. The other terminal of the winding 4 is adapted to be connected to the conductor 11 through the stationary contact member 13 and a movable contact member 14 of a relay device 15. The relay device 15 further comprises an armature 17 and a winding 16 that is connected to the terminals of the auxiliary winding 5. The armature 17 is pivotally connected to the contact member 14 by a spindle 18 that extends through the core 19 of the relay. The armature 17 is normally held away from the core 19 by a spring 20, thereby maintaining the contact members 13 and 14 in closed relation and completing the circuit of the starting winding 4 with the source 9.

Having fully described the winding and circuit connections of the motor, the operation of my device is as follows. The primary winding 3 and the starting winding 4 being energized from the source 9 through the conductors 10, 11 and 12 and the normally closed contact members 13 and 14, the motor starts as a split-phase motor, as will be readily understood. At the moment of starting, the resultant magnetic field produced by the primary winding 3 and the starting winding 4 induces a voltage in the auxiliary winding 5. The value of this voltage is very small, as the auxiliary winding is so distributed in the slots that the magnetic fields produced by the main and starting windings tend to substantially neutralize each other with respect to the auxiliary winding. The direction of current flow in the windings is indicated by arrows in Fig. 3. As the speed of the motor increases, a cross-flux is produced in the primary core member by the reaction of the secondary winding 6 which induces a rotational voltage in the auxiliary winding. The relay 15 is so designed that when the motor reaches a predetermined speed, the total voltage induced in the auxiliary winding 5 energizes the coil 16 sufficiently to cause the armature 17 to be drawn toward the core 18. The contact members 13 and 14 will then be separated, thereby opening the circuit of the starting winding 4.

A modification of the relay device is shown in Fig. 2 wherein the relay is wound differentially. One winding 16 is connected across the terminals of the auxiliary winding 5 and an opposing winding 21 is so connected that it is energized simultaneously with the primary winding 3. The spring 20 tends to hold the contact members 13 and 14 apart but as soon as the winding 21 is energized, the armature 17 is drawn toward the core 19 to close the contact members, thereby completing the circuit of the starting winding 4. When the motor reaches a predetermined speed, the voltage induced in the auxiliary winding 5 energizes the relay winding 16 which neutralizes the effect of the relay winding 21. The spring 20 then retracts the armature 17 and opens the contact members 13 and 14, thereby interrupting the circuit of the starting winding 4. It will be readily understood that by using the differentially wound relay, all tendency for the armature 17 to chatter will be eliminated by the neutralizing effect of the windings 21 and 16. Furthermore, the operation of the relay device is positive and certain, as it is entirely dependent upon the production of a voltage in the auxiliary winding.

While I have shown my invention as applied to a particular type of induction motor, it is not so limited but may be as readily applied to all motors operating on the same general principle and in connection with various other relay devices and I desire that only such limitations shall be imposed thereon as may fall within the scope of the appended claims.

I claim as my invention:

1. In an electric motor, the combination with relatively rotatable primary and secondary members, a starting winding carried by said primary member and an auxiliary winding carried by said primary member and adapted to be energized by the cross-flux produced in said primary member by the reaction of said secondary member, of a relay device for controlling said starting winding, the operation of which is dependent upon the energization of said auxiliary winding, and means controlled by said relay for rendering the said starting winding ineffective when the cross-flux attains a predetermined value.

2. In an electric motor, the combination with primary and secondary members, a main winding, a starting winding carried by said primary member and an auxiliary winding carried by said primary member and adapted to be energized by the cross-flux in said primary member, of a differential relay device for controlling said starting winding, the operation of which is dependent upon the energization of said main and auxiliary windings.

3. In an electric motor, the combination with primary and secondary members, a starting winding carried by said primary member and an auxiliary winding carried by said primary member and adapted to be energized by the cross-flux in said primary member, of a differential relay device for controlling said starting winding, the operation of which is dependent upon the energization of said main and auxiliary windings, and means controlled by said relay for rendering the said starting winding ineffective when the voltage induced in said auxiliary winding by the cross-flux attains a predetermined value.

4. In an electric motor, the combination with relatively rotatable magnetizable members respectively provided with a primary winding and a secondary squirrel-cage winding, and a starting winding arranged to produce a magnetic field displaced from that produced by the primary windings, of an auxiliary winding interlinked with said primary and starting windings and so arranged that the voltage induced therein is a function of the flux produced by the reaction of said primary and secondary members.

5. In an electric motor, the combination with relatively rotatable magnetizable members provided with primary and secondary windings, respectively, and a starting winding arranged to produce a magnetic field displaced from that produced by the primary winding, of an auxiliary winding interlinked with said primary and starting windings and so arranged that the voltage induced therein by the flux traversing the primary member shall be substantially a minimum when the motor starts and shall be a maximum when the motor reaches a predetermined speed.

In testimony whereof I have hereunto subscribed my name this 27th day of May, 1916.

OLIVER S. JENNINGS.